United States Patent
Kim et al.

(10) Patent No.: US 9,318,738 B2
(45) Date of Patent: Apr. 19, 2016

(54) LITHIUM SECONDARY BATTERY INCLUDING MULTI-LAYERED ACTIVE MATERIAL LAYERS

(71) Applicant: LG Chem, Ltd., Seoul (KR)

(72) Inventors: Ji Sun Kim, Daejeon (KR); Min Ho Youn, Daejeon (KR); Dong Seok Shin, Daejeon (KR); Hyo Seok Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/468,645

(22) Filed: Aug. 26, 2014

(65) Prior Publication Data
US 2014/0363736 A1  Dec. 11, 2014

Related U.S. Application Data

(63) Continuation of application No. PCT/KR2014/004633, filed on May 23, 2014.

(30) Foreign Application Priority Data

May 23, 2013 (KR) .................. 10-2013-0058316

(51) Int. Cl.
*H01M 4/134* (2010.01)
*H01M 4/131* (2010.01)
*H01M 4/13* (2010.01)
*H01M 4/36* (2006.01)
*H01M 4/505* (2010.01)
*H01M 4/58* (2010.01)
(Continued)

(52) U.S. Cl.
CPC .............. *H01M 4/366* (2013.01); *H01M 4/131* (2013.01); *H01M 4/133* (2013.01); *H01M 4/505* (2013.01); *H01M 4/587* (2013.01); *H01M 4/5825* (2013.01); *H01M 10/052* (2013.01); *H01M 10/0525* (2013.01); *H01M 4/134* (2013.01); *H01M 4/386* (2013.01); *H01M 4/387* (2013.01); *H01M 2004/021* (2013.01); *H01M 2220/30* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 5,744,258 A    4/1998 Bai et al.
2003/0129497 A1  7/2003 Yamamoto et al.
(Continued)

FOREIGN PATENT DOCUMENTS

EP    2437337 A1    4/2012
JP    H08-153514 A  6/1996
(Continued)

OTHER PUBLICATIONS

Machine translation of KR 1020120040430, retrieved from <http://kposd.kipo.go.kr:8088/up/kpion/> on Sep. 26, 2015.*
(Continued)

*Primary Examiner* — Cynthia K Walls
(74) *Attorney, Agent, or Firm* — Lerner, David, Littenberg, Krumholz & Mentlik, LLP

(57) ABSTRACT

A lithium secondary battery of the present invention may simultaneously improve high output and high capacity characteristics by including a first active material layer having high output characteristics and a second active material layer having high capacity characteristics respectively on a cathode collector and an anode collector.

20 Claims, 1 Drawing Sheet

(51) Int. Cl.
  *H01M 4/133*   (2010.01)
  *H01M 4/587*   (2010.01)
  *H01M 10/052*  (2010.01)
  *H01M 10/0525* (2010.01)
  *H01M 4/38*        (2006.01)
  *H01M 4/02*        (2006.01)

(56) References Cited

U.S. PATENT DOCUMENTS

| | | | |
|---|---|---|---|
| 2008/0241666 A1* | 10/2008 | Baba et al. | 429/158 |
| 2010/0261063 A1* | 10/2010 | Kitagawa et al. | 429/232 |
| 2011/0136011 A1 | 6/2011 | Yura et al. | |
| 2012/0009475 A1* | 1/2012 | Nakura | 429/220 |
| 2012/0021284 A1 | 1/2012 | Lee et al. | |
| 2012/0082877 A1 | 4/2012 | Song et al. | |
| 2012/0251886 A1* | 10/2012 | Yushin et al. | 429/231.5 |
| 2012/0251892 A1 | 10/2012 | Kang et al. | |
| 2012/0276457 A1* | 11/2012 | Hirose et al. | 429/405 |
| 2013/0045427 A1 | 2/2013 | Zhamu et al. | |
| 2014/0080001 A1 | 3/2014 | Han et al. | |
| 2014/0099551 A1 | 4/2014 | Han et al. | |
| 2014/0127583 A1 | 5/2014 | Han et al. | |

FOREIGN PATENT DOCUMENTS

| | | |
|---|---|---|
| JP | H11-126602 A | 5/1999 |
| JP | 2003-077461 A | 3/2003 |
| JP | 2005-085720 A | 3/2005 |
| JP | 2006-318868 A | 11/2006 |
| JP | 2008-198596 A | 8/2008 |
| JP | 2009-193924 A | 8/2009 |
| JP | 2010-015942 A | 1/2010 |
| JP | 2010-153258 A | 7/2010 |
| JP | 2010-212262 A | 9/2010 |
| KR | 2003-0049924 A | 6/2003 |
| KR | 2011-0127209 A | 11/2011 |
| KR | 2012-0009703 A | 2/2012 |
| KR | 2012-0040430 A | 4/2012 |
| KR | 2012-0130716 A | 12/2012 |
| WO | 2012161482 A2 | 11/2012 |
| WO | 2013009078 A2 | 1/2013 |

OTHER PUBLICATIONS

European Search Report for Application No. EP14801318 dated Mar. 13, 2015.
International Search Report from PCT/KR2014/004633 dated Sep. 2, 2014.

* cited by examiner

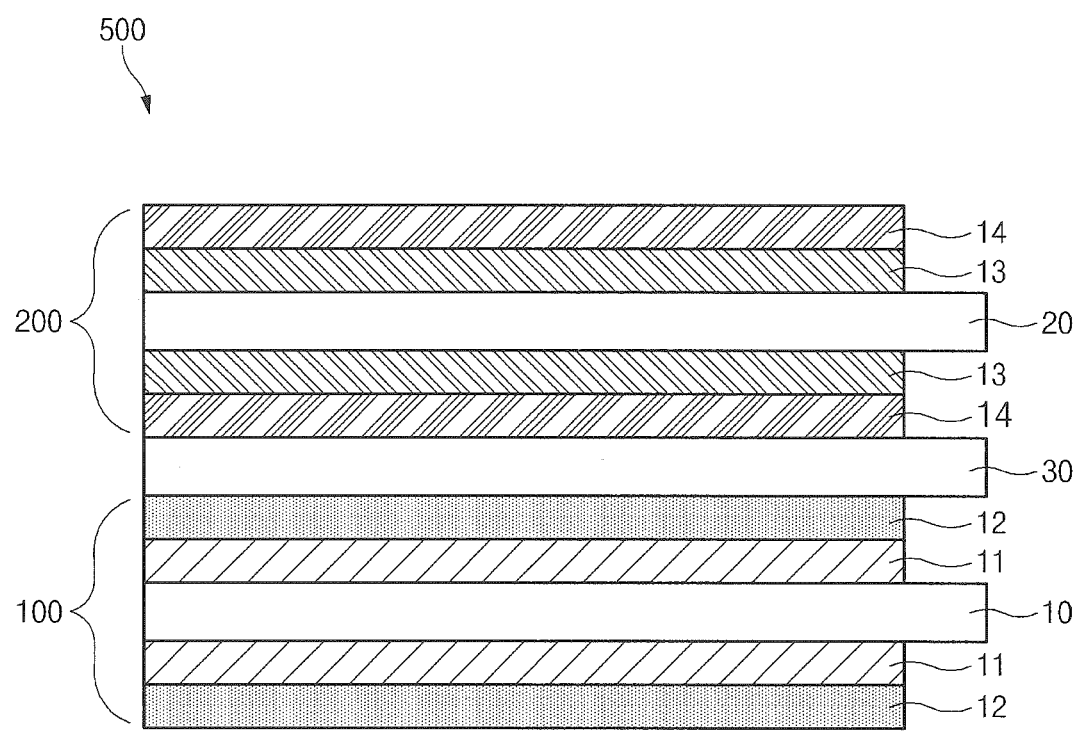

LITHIUM SECONDARY BATTERY INCLUDING MULTI-LAYERED ACTIVE MATERIAL LAYERS

CROSS REFERENCE TO RELATED APPLICATIONS

The present application is a continuation of International Application No. PCT/KR2014/004633 filed on May 23, 2014, which claims the benefit of Korean Patent Application No. 10-2013-0058316 filed on May 23, 2013 the disclosures of which are incorporated herein by reference.

TECHNICAL FIELD

The present invention relates to a lithium secondary battery including multi-layered electrode active material layers on a current collector.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A lithium secondary battery denotes a battery in which a non-aqueous electrolyte containing lithium ions is included in an electrode assembly which has a microporous separator disposed between a cathode including a cathode active material capable of intercalating and deintercalating lithium ions and an anode including an anode active material capable of intercalating and deintercalating lithium ions.

For example, as a cathode active material of a lithium secondary battery, transition metal oxides, such as lithium cobalt oxide ($LiCoO_2$), lithium manganese oxide ($LiMn_2O_4$), or lithium nickel oxide ($LiNiO_2$), or composite oxides having a portion of the above transition metals substituted with other transition metals have been used.

Among the above cathode active materials, since $LiCoO_2$ has excellent various properties such as cycle characteristics, $LiCoO_2$ has currently been widely used. However, $LiCoO_2$ has low stability, is expensive as a raw material due to the resource limit of cobalt, and has limitations in being mass used as a power source of applications such as electric vehicles.

Since lithium manganese oxides, such as $LiMnO_2$ or $LiMn_2O_4$, have advantages in that resources thereof are abundant as a raw material and environmentally-friendly manganese is used therein, lithium manganese oxides have receive great attention as a cathode active material that may replace $LiCoO_2$. However, these lithium manganese oxides have disadvantages in that their capacity is small and cycle characteristics are poor.

Lithium has been initially used as an anode active material constituting an anode of a lithium secondary battery. However, since lithium may have low reversibility and safety, a carbon-based active material has currently been mainly used as the anode active material of the lithium secondary battery. Although the carbon material may have a lower capacity than lithium, the carbon material may have smaller volume changes as well as excellent reversibility and may also be advantageous in terms of cost.

The carbon-based active material may be categorized into an amorphous carbon-based active material and a crystalline carbon-based active material such as graphite. The amorphous carbon-based active material may have high discharge capacity and excellent rate characteristics, but may have disadvantages in that irreversible capacity is high, charge and discharge efficiency is poor, and energy density is poor due to low volume density and electrical conductivity. In contrast, the crystalline carbon-based active material has low discharge capacity, but the crystalline carbon-based active material has very good energy density, has good potential flatness, and has relatively better reversibility between charge and discharge processes than the amorphous carbon-based compound.

Thus, it is important to select an active material layer that may improve the performance of the battery in consideration of the above characteristics. In general, with respect to electrodes, charge balance between the cathode and the anode must be well maintained, and various problems may occur when the charge balance is not maintained because output characteristics of any one of the cathode and the anode become much better. That is, in the case that the output characteristics of the cathode are better than those of the anode, since the insertion and release of lithium are maximized, limitations due to the insertion and release of a large amount of lithium may occur. Thus, life characteristics of the lithium secondary battery may be reduced. In contrast, in the case in which the output characteristics of the anode are better than those of the cathode, lithium is not intercalated into the cathode and a side reaction may occur.

DISCLOSURE OF THE INVENTION

Technical Problem

The present invention is provided to solve technical problems of the related art.

The present invention provides a lithium secondary battery that may simultaneously improve high output characteristics and high energy characteristics.

Technical Solution

According to an aspect of the present invention, there is provided a lithium secondary battery including: (1) a cathode in which a cathode collector; a first cathode active material layer including a spinel-structured lithium manganese oxide active material on at least one surface of the cathode collector; and a second cathode active material layer including a layer-structured lithium composite oxide active material on the first cathode active material layer are sequentially formed; and (2) an anode in which an anode collector; a first anode active material layer including an amorphous carbon-based active material on at least one surface of the anode collector; and a second anode active material layer including any one selected from the group consisting of a crystalline carbon-based material, transition metal oxide, a silicon (Si)-based material, and a tin (Sn)-based material, or two or more active materials thereof on the first anode active material layer are sequentially formed.

Advantageous Effects

A lithium secondary battery of the present invention may simultaneously improve high output and high capacity characteristics as well as initial efficiency by including a first active material layer having high output characteristics and a second active material layer having high capacity characteristics respectively on a cathode collector and an anode collector.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic view illustrating a lithium secondary battery including a cathode including multi-layered cathode active material layers, an anode including multi-layered anode active material layers, and a separator disposed between the cathode and the anode according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As illustrated in FIG. 1, a lithium secondary battery 500 according to an embodiment of the present invention includes (1) a cathode 100 in which a cathode collector 10; a first cathode active material layer 11 including a spinel-structured lithium manganese oxide active material on at least one surface of the cathode collector 10; and a second cathode active material layer 12 including a layer-structured lithium composite oxide active material on the first cathode active material layer 11 are sequentially formed; and (2) an anode 200 in which an anode collector 20; a first anode active material layer 13 including an amorphous carbon-based active material on at least one surface of the anode collector 20; and a second anode active material layer 14 including any one selected from the group consisting of crystalline carbon-based material, transition metal oxide, silicon (Si)-based material, and tin (Sn)-based material, or two or more active materials thereof on the first anode active material layer 13 are sequentially formed. Also, a separator 30 is disposed between the cathode 100 and the anode 200.

A lithium secondary battery according to an embodiment of the present invention may simultaneously improve high output and high capacity characteristics as well as initial efficiency by including a first active material layer having high output characteristics and a second active material layer having high capacity characteristics respectively on a cathode collector and an anode collector.

According to an embodiment of the present invention, the spinel-structured lithium manganese oxide active material having high output characteristics included in the first cathode active material layer may include $LiMn_2O_4$ or $LiCoMn_2O_4$, and the layer-structured lithium composite oxide active material having high capacity characteristics included in the second cathode active material layer may include a compound expressed by Chemical Formula 1 or Chemical Formula 2 below:

<Chemical Formula 1>

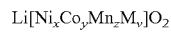

$Li[Ni_xCo_yMn_zM_v]O_2$ (where M is any one selected from the group consisting of aluminum (Al), gallium (Ga), and indium (In), or two or more elements thereof; and $0.3 \leq x < 1.0$, $0 \leq y$, $z \leq 0.5$, $0 \leq v \leq 0.1$, and $x+y+z+v=1$)

<Chemical Formula 2>

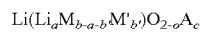

$Li(Li_aM_{b-a-b'}M'_{b'})O_{2-c}A_c$ (where $0 \leq a \leq 0.2$, $0.6 \leq b \leq 1$, $0 \leq b' \leq 0.2$, and $0 \leq c \leq 0.2$; M includes manganese (Mn), and a least one selected from the group consisting of nickel (Ni), cobalt (Co), iron (Fe), chromium (Cr), vanadium (V), copper (Cu), zinc (Zn), and titanium (Ti); M' is at least one selected from the group consisting of Al, magnesium (Mg), and boron (B); and A is at least one selected from the group consisting of phosphorous (P), fluorine (F), sulfur (S), and nitrogen (N)).

Since the spinel-structured lithium manganese oxide active material has excellent ionic conductivity and electronic conductivity, the first cathode active material layer including the spinel-structured lithium manganese oxide active material is disposed at a position near the cathode collector, i.e., directly on the cathode collector, to further increase the output characteristics. Also, since the second cathode active material layer including the layer-structured lithium composite oxide active material is disposed on the first cathode active material layer, an electrode reaction may preferentially occur due to the finer composite oxide included in the layer-structured lithium composite oxide active material when the charge and discharge are performed. Thus, the capacity characteristics of the battery may be further improved. In particular, since the layer-structured lithium composite oxide active material has a layered crystal structure, the diffusion path of lithium in the oxide is two-dimensional. Thus, the volume output density of the electrode is excellent.

Therefore, in a case where the spinel-structured lithium manganese oxide active material and the layer-structured lithium composite oxide active material are separated to be formed as multi-layers on the cathode collector, the output density and volume energy density of the cathode are simultaneously improved, and thus, both the output characteristics and the capacity characteristics of the battery may be increased.

A charge and discharge capacity of the first cathode active material layer may preferably be in a range of 100 mAh/g to 119 mAh/g, and a charge and discharge capacity of the second cathode active material layer may be in a range of 120 mAh/g to 200 mAh/g.

The first cathode active material layer may preferably be thinner than the second cathode active material layer. A thickness ratio of the first cathode active material layer:the second cathode active material layer is in a range of 50:50 to 10:90, and may be in a range of 50:50 to 30:70.

When the thickness of the first cathode active material layer is excessively high, the output characteristics of the secondary battery may be increased. However, since side reactants generated due to the side reaction with an electrolyte solution may adversely affect the separator or the anode, the cycle characteristics may be reduced. Also, when the second cathode active material layer is excessively thin, targeted capacity of the secondary battery may be difficult to be improved. Furthermore, a coating area of the second cathode active material layer may be the same or greater than a coating area of the first cathode active material layer so as to completely cover the first cathode active material layer.

A net density of the first cathode active material layer may be in a range of 4.0 g/cc to 4.3 g/cc, and a net density of the second cathode active material layer may be in a range of 4.5 g/cc to 4.9 g/cc. Since the net density of the second cathode active material layer is greater than the net density of the first cathode active material layer, the capacity characteristics of the lithium secondary battery may be further improved.

A specific surface area (BET-SSA) of the first cathode active material layer may be in a range of 0.4 m$^2$/g to 0.5 m$^2$/g, and a specific surface area of the second cathode active material layer may be in a range of 0.5 m$^2$/g to 0.6 m$^2$/g. In the case that the specific surface area of the first cathode active material layer is outside the above range, the adhesion of the electrode may be reduced, and in the case in which the specific surface area of the second cathode active material layer is outside the above range, it is undesirable because initial irreversible capacity during charge and discharge may increase. The specific surface area of the cathode active material layer may be measured by a Brunauer-Emmett-Teller (BET) method.

The lithium secondary battery according to the embodiment of the present invention may include an anode in which an anode collector; a first anode active material layer including an amorphous carbon-based active material on at least one surface of the anode collector; and a second anode active material layer including any one selected from the group consisting of crystalline carbon-based material, transition metal oxide, Si-based material, and Sn-based material, or two or more active materials thereof on the first anode active material layer are sequentially formed.

Since the amorphous carbon-based active material does not have a specific structure, a path for intercalating lithium ions is not limited and the number of the intercalation paths for lithium ions is relatively larger than that of the crystalline carbon-based active material. Thus, the amorphous carbon-based active material exhibits excellent output characteristics. However, the amorphous carbon-based active material has disadvantages in that its irreversible capacity is very high at about 20% to about 30%. In contrast, any one selected from the group consisting of crystalline carbon-based material, transition metal oxide, Si-based material, and Sn-based material, or two or more active materials thereof may have high capacity.

Thus, the anode of the present invention may increase the output characteristics of the secondary battery by disposing the first anode active material layer including the amorphous carbon-based active material having high output characteristics at a position near the anode collector, i.e., directly on the anode collector, and may also increase capacity characteristics by disposing the second anode active material layer including any one selected from the group consisting of crystalline carbon-based material, transition metal oxide, Si-based material, and Sn-based material, or two or more active materials thereof on the first anode active material layer.

That is, the first anode active material layer having excellent output characteristics may be disposed on the anode collector and the second anode active material layer having excellent capacity characteristics may be disposed thereon to complement the disadvantages of the first anode active material layer and second anode active material layer each other and simultaneously further improve the output characteristics and capacity characteristics. Also, the anode of the present invention has high energy density, excellent rate characteristics, and excellent impregnating property with respect to the electrolyte solution.

According to an embodiment of the present invention, a charge and discharge capacity of the first anode active material layer may be in a range of 200 mAh/g to 310 mAh/g, and a charge and discharge capacity of the second anode active material layer may be in a range of 300 mAh/g to 400 mAh/g.

The amorphous carbon-based active material according to an embodiment of the present invention is not particularly limited as long as it exhibit excellent rate characteristics while carbon atoms have an amorphous structure. A material obtained from at least one amorphous carbon precursor selected from the group consisting of hard carbon raw materials including sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin, or a vinyl chloride resin; and soft carbon raw materials including a coal-based pitch, a petroleum-based pitch, polyvinyl chloride, a mesophase pitch, tar, or low molecular weight heavy oil may be used as the amorphous carbon-based active material.

A graphite-based carbon material may be typically used as the crystalline carbon-based active material which may be formed in the second anode active material layer, and natural graphite and artificial graphite may be used.

Also, examples of the transition metal oxide, which may be formed in the second anode active material layer, may be any one selected from the group consisting of $SnO_2$, $Fe_2O_3$, $Fe_3O_4$, $NiO$, $CoO$, $Co_2O_3$, $CO_3O_4$, $Sn_{1-x}Ti_xO_2$ (x=0.1 to 0.9), $Zn_2SnO_4$, $CoSnO_3$, $CaSnO_3$, $ZnCo_2O_4$, $Co_2SnO_4$, $Mg_2SnO_4$, and $Mn_2SnO_4$, or a mixture of two or more thereof.

As another example, the Si-based material, which may be formed in the second anode active material layer, may include any one selected from the group consisting of single Si; a Si—C composite formed by mechanical alloying of Si and a carbonaceous material; a composite formed by mechanical alloying of Si and metal; a carbon-Si nanocomposite; Si coated with Si oxide and carbon, or Si oxide, or a mixture of two or more thereof.

The first anode active material layer may be thinner than the second anode active material layer. A thickness ratio of the first anode active material layer:the second anode active material layer is in a range of 50:50 to 10:90, and preferably, in a range of 50:50 to 30:70.

When the thickness of the first anode active material layer is excessively large, the output characteristics of the secondary battery may be increased, but the cycle characteristics may be reduced. Also, when the second anode active material layer is excessively thin, the targeted capacity of the secondary battery may be difficult to be improved. Furthermore, a coating area of the second anode active material layer may be the same or greater than a coating area of the first anode active material layer so as to completely cover the first anode active material layer.

A net density of the first anode active material layer may be in a range of 1.9 g/cc to 2.15 g/cc, and a net density of the second anode active material layer may be in a range of 2.15 g/cc to 2.3 g/cc. Since the net density of the second anode active material layer is greater than the net density of the first anode active material layer, the capacity characteristics of the secondary battery may be further improved.

A specific surface area (BET-SSA) of the first anode active material layer may be in a range of 2 m$^2$/g to 2.7 m$^2$/g, and a specific surface area of the second anode active material layer may be in a range of 2.8 m$^2$/g to 3.5 m$^2$/g. In the case that the specific surface area of the first anode active material layer is outside the above range, the adhesion of the electrode may be reduced, and in the case in which the specific surface area of the second anode active material layer is outside the above range, it is undesirable because the initial irreversible capacity during charge and discharge may increase. The specific surface area of the anode active material layer may be measured by the BET method.

The lithium secondary battery having both the cathode and the anode including multi-layered active material layers according to the embodiment of the present invention may simultaneously improve output characteristics and capacity characteristics in comparison to a lithium secondary battery having a cathode or anode including at least one single active material layer.

In general, when the cathode or the anode includes a single active material layer, it may be difficult to simultaneously satisfy both high output characteristics and high capacity characteristics.

In the case that the cathode or the anode is composed of a single active material layer, there is a method of typically blending an active material having high output characteristics and an active material having high capacity characteristics in order to satisfy high output characteristics and high capacity characteristics. In this case, the high capacity characteristics may be generally satisfied. However, the high output characteristics may not be fully obtained. The reason for this is that when the active material having high output characteristics and the active material having high capacity characteristics are mixed to simultaneously participate in a reaction, the high output characteristics may be relatively reduced.

However, as in the embodiment of the present invention, in the case that the first active material layer having high output characteristic is directly disposed on the current collector and the second active material layer is disposed on the first active material layer having high output characteristic to form multi-layered active material layers, the first active material layer having high output characteristic may first participate in a reaction and the second active material layer having high capacity characteristics may easily participate in the reaction through the first active material layer having high output characteristic. Thus, higher output characteristics as well as higher capacity characteristics may be realized than the case in which the active material having high output characteristics and the active material having high capacity characteristics are blended to form a single active material layer.

According to an embodiment of the present invention, as a desirable combination of the cathode active material layer and the anode active material layer, the cathode active material layer and the anode active material layer are not particularly limited as long as the first cathode active material and the first anode active material are formed of a material having high output characteristics and the second cathode active material and the second anode active material are formed of a material having high capacity characteristics to simultaneously improve the high capacity and high output characteristics, i.e., the aimed effects of the present invention.

According to an embodiment of the present invention, the cathode collector is generally fabricated to have a thickness of 3 µm to 500 µm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like.

The cathode collector may have an uneven surface to improve the bonding strength of a cathode active material and may have any of various shapes such as a film, a sheet, a foil, a net, a porous body, a foam body, a non-woven fabric body, and the like.

The anode collector is generally fabricated to have a thickness of 3 µm to 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

The cathode of the present invention may be prepared by including coating at least one surface of a current collector with a slurry including a spinel-structured lithium manganese oxide active material and drying to form a first cathode active material layer; and coating a surface of the first cathode active material layer with a slurry including a layer-structured lithium composite oxide active material and drying to form a second cathode active material layer.

These slurries may be prepared by mixing an active material, a conductive agent, and a binder with a predetermined solvent.

The conductive agent is typically added in an amount of 1 wt % to 20 wt % based on a total weight of the mixture including the cathode active material. Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists the binding between the active material and the conductive agent, and the binding with the current collector. The binder is typically added in an amount of 1 wt % to 20 wt % based on the total weight of the mixture including the cathode active material. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluorine rubber, and various copolymers.

Also, preferred examples of the solvent may include dimethyl sulfoxide (DMSO), alcohol, N-methyl pyrrolidone (NMP), acetone, or water, and the solvent is removed in a drying process.

The anode of the present invention may be prepared by including coating at least one surface of a current collector with a slurry including an amorphous carbon-based active material and drying to form a first anode active material layer; and coating one surface of the first anode active material layer with a slurry including any one selected from the group consisting of crystalline carbon-based material, transition metal oxide, Si-based material, and Sn-based material, or two or more active materials thereof and drying to form a second anode active material layer.

These slurries may be prepared by mixing an active material and a polymer binder with a predetermined solvent.

Polyvinylidene fluoride (PVDF), polyvinyl alcohol, CMC, starch, hydroxypropyl cellulose, regenerated cellulose, polyvinylpyrrolidone, tetrafluoroethylene, polyethylene, polypropylene, an EPDM, a sulfonated EPDM, a styrene-butadiene rubber, a fluorine rubber, and various copolymers thereof may be used as the polymer binder.

Also, preferred examples of the solvent may be DMSO, alcohol, NMP, acetone, or water, and the solvent is removed in a drying process.

A method of coating the prepared cathode active material slurry or anode active material slurry may be selected from known methods in consideration of material properties or may be performed by a new appropriate method. For example, a slurry is distributed on the current collector, and the slurry is then uniformly dispersed using a doctor blade, or a method, such as die coating, comma coating, and screen printing, may be selected.

The slurry is coated and a drying process is then performed. In particular, with respect to the cathode or the anode of the present invention, after the first cathode active material layer or the first anode active material layer is formed and then dried, the second cathode active material layer or the second anode active material layer may be formed. A method of coating the coating layer is not particularly limited. However, the first cathode active material layer and the first anode active material layer, for example, may be coated by die coating, and the second cathode active material layer and the second anode active material layer, for example, may be coated by nozzle coating for saving time.

When the cathode and the anode are prepared, a lithium secondary battery including a separator disposed between the cathode and the anode and an electrolyte solution, which are typically used in the art, may be prepared using the cathode and anode.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

In an electrolyte solution used in an embodiment of the present invention, a lithium salt, which may be included as the electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in an embodiment of the present invention, an organic solvent included in the electrolyte solution may be used without limitation so long as it is typically used, and typically, at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, included in a typical electrolyte.

A separator is disposed between the cathode and the anode to form a battery assembly, the battery assembly is put in a cylindrical battery case or prismatic battery case, and a secondary battery is then completed when the electrolyte is injected thereinto. Also, the battery assembly is stacked and impregnated with the electrolyte solution, and a secondary battery is then completed when the product thus obtained is put in a battery case and sealed.

Any battery case typically used in the art may be selected as a battery case used in the present invention. A shape of the battery case according to the use of the battery is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Preparation of Lithium Secondary Battery

[Preparation of Cathode having Multi-layered Active Material Layers]

A first cathode active material slurry was prepared by mixing 92 wt % of $LiMn_2O_4$ as a first cathode active material, 4 wt % of super-p as a conductive agent, and 4 wt % of polyvinylidene fluoride as a binder.

Both sides of an about 20 μm thick aluminum (Al) thin film, as a cathode collector, were coated with the first cathode active material slurry by die coating, and then dried to obtain a first cathode active material layer.

Drying was performed at room temperature for 20 minutes to dry the first cathode active material layer, and the first cathode active material layer was coated with second cathode active material slurry, which was obtained by mixing 92 wt % of Li(Li$_{0.2}$Mn$_{0.55}$Ni$_{0.15}$Co$_{0.1}$)O$_2$ as a second cathode active material, 4 wt % of super-p as a conductive agent, and 4 wt % of polyvinylidene fluoride as a binder, by nozzle spray coating to form a second cathode active material layer.

A thickness ratio of the first cathode active material layer: the second cathode active material layer was 1:2. Next, drying was performed at room temperature for 20 minutes and then performed at about 80° C. for 1 hour. Then, roll press was performed to prepare a cathode having multi-layered active material layers.

<Preparation of Anode having Multi-layered Active Material Layers>

A first anode active material slurry was prepared by mixing 95.5 wt % of pitch (soft carbon) as a first anode active material, 1.5 wt % of super-p as a conductive agent, and 1.5 wt % of a styrene-butadiene rubber (SBR) and 1.5 wt % of carboxymethyl cellulose (CMC) as a binder, and adding the mixture to N-methyl-2-pyrrolidone (NMP) as a solvent.

Both sides of an about 20 μm thick copper foil, as an anode collector, were coated with the first cathode active material slurry by die coating, and then dried to obtain a first anode active material layer.

Drying was performed at room temperature for 20 minutes to dry the first anode active material layer. A second anode active material slurry was prepared by mixing 95.5 wt % of natural graphite as a second anode active material, 1.5 wt % of super-p as a conductive agent, and 1.5 wt % of a SBR and 1.5 wt % of CMC as a binder, and adding the mixture to NMP as a solvent. Then, the first anode active material was coated with the slurry by nozzle spray coating to form a second anode active material layer.

A thickness ratio of the first anode active material layer:the second anode active material layer was 1:2. Next, drying was performed at room temperature for 20 minutes and then performed at about 80° C. for 20 minutes. Then, roll press was performed to prepare an anode having multi-layered active material layers.

<Preparation of Lithium Secondary Battery>

A non-aqueous electrolyte solution was prepared by adding 1.0 M LiPF$_6$ to an organic solvent having a composition in which a volume ratio of ethylene carbonate (EC):propylene carbonate (PC):diethyl carbonate (DEC) was 3:2:5.

Also, a polyolefin separator was disposed between the cathode and the anode, and the electrolyte solution was then injected to prepare a lithium secondary battery.

Comparative Example 1

Preparation of Secondary Battery having Single Active Material Layer

<Preparation of Cathode>

A cathode active material slurry was prepared by mixing 92 wt % of LiCoO$_2$ as a cathode active material, 4 wt % of super-p as a conductive agent, and 4 wt % of polyvinylidene fluoride as a binder, and adding the mixture to NMP as a solvent. Then, one side of an Al thin film, as a cathode collector, was coated with the slurry and dried. Then, roll press was performed to prepare a cathode.

<Preparation of Anode>

An anode active material slurry was prepared by mixing 95.5 wt % of natural graphite as an anode active material, 1.5 wt % of super-p as a conductive agent, and 1.5 wt % of a SBR and 1.5 wt % of CMC as a binder, and adding the mixture to NMP as a solvent. One surface of a copper foil was coated with the slurry and dried. Then, roll press was performed to prepare an anode.

<Preparation of Lithium Secondary Battery>

A non-aqueous electrolyte solution was prepared by adding 1.0 M LiPF$_6$ to an organic solvent having a composition in which a volume ratio of ethylene carbonate (EC):propylene carbonate (PC):diethyl carbonate (DEC) was 3:2:5.

Also, a polyolefin separator was disposed between the cathode and the anode, and the electrolyte solution was then injected to prepare a lithium secondary battery.

Comparative Example 2

Lithium Secondary Battery Having Cathode Including Multi-Layered Cathode Active Material Layers and Anode Including Single-Layered Anode Active Material Layer A lithium secondary battery was prepared in the same manner as in Example 1 except that in the preparation of an anode, an anode active material slurry was prepared by mixing 95.5 wt % of natural graphite as an anode active material, 1.5 wt % of super-p as a conductive agent, and 1.5 wt % of a SBR and 1.5 wt % of CMC as a binder and adding the mixture to NMP as a solvent, one surface of a copper foil was coated with the slurry and dried, and roll press was then performed to prepare the anode.

Comparative Example 3

Lithium Secondary Battery Having Cathode Including Single-Layered Cathode Active Material Layer and Anode Including Multi-Layered Anode Active Material Layers A lithium secondary battery was prepared in the same manner as in Example 1 except that in the preparation of a cathode, a cathode active material slurry was prepared by mixing 92 wt % of LiCoO$_2$ as a cathode active material, 4 wt % of super-p as a conductive agent, and 4 wt % of polyvinylidene fluoride as a binder and adding the mixture to NMP as a solvent, one side of an Al thin film, as a cathode collector, was coated with the slurry and dried, and roll press was then performed to prepare the cathode.

Experimental Example 1

Initial Efficiency Characteristics Test

In order to investigate initial efficiencies of the lithium secondary batteries prepared in Examples 1 and Comparative Examples 1 to 3, the lithium secondary batteries prepared in Examples 1 and Comparative Examples 1 to 3 were charged at 1 C to a voltage of 4.15 V and charged to a current of 0.05 C at 4.15 V under constant current/constant voltage (CC/CV) conditions at 25° C., and then discharged at 1 C to a voltage of 2.5 V under a constant current (CC) condition to measure the initial efficiencies. The initial efficiency is a value obtained by dividing first discharge capacity by first charge capacity, and the results thereof are presented in Table 1 below.

Experimental Example 2

Output Characteristics Test

Output values were calculated from voltage differences which were obtained by respectively charging and discharging the lithium secondary batteries of Example 1 and Comparative Examples 1 to 3 at 5 C for 10 seconds at a state of charge (SOC) of 50% at 25° C. The results thereof are presented in Table 1.

TABLE 1

|  | Initial efficiency (%) | Cathode thickness (μm) | Anode thickness (μm) | Degradation rate (%) $500^{th}/1^{st}$ | Discharge output (W/g) (SOC 50%) | Charge output (W/g) (SOC 50%) | Discharge output (W/Ah) | Charge output (W/Ah) |
|---|---|---|---|---|---|---|---|---|
| Example 1 | 91.0 | 156 | 126 | 92 | 2.9 | 2.2 | 57.7 | 43.8 |
| Comparative Example 1 | 91.0 | 134 | 120 | 93 | 2.7 | 1.9 | 50.7 | 35.6 |
| Comparative Example 2 | 91.5 | 154 | 120 | 90 | 2.7 | 2.0 | 52.9 | 39.2 |
| Comparative Example 3 | 90.5 | 134 | 126 | 87 | 2.8 | 2.1 | 52.5 | 39.4 | initial efficiency: a value obtained by dividing first discharge capacity by first charge capacity
thickness: total thickness of active material + current collector + binder + conductive agent
degradation rate: a value obtained by dividing $500^{th}$ discharge capacity by the first discharge capacity (45° C.)
output: a value obtained by dividing an output value at 50% SOC by the total weight of a cell (25° C.)
capacity per unit area was 2.5 mAh/cm$^2$ for all cases As illustrated in Table 1, the lithium secondary battery of Example 1, in which the cathode including multi-layered cathode active material layers and the anode including multi-layered anode active material layers were used, exhibited differences in discharge output value (W/g) and charge output value (W/g) at 50% SOC of about 5% to about 10% in comparison to Comparative Examples 1 to 3 in which at least one electrode of the cathode and the anode included a single-layered active material layer, while having an excellent initial efficiency of 91%.

Also, it may be understood that the discharge output value identified by an output/capacity ratio (W/Ah) of Example 1 was significantly increased by about 13% or more in comparison to that of Comparative Example 1 in which both the cathode and the anode included a single-layered active material layer, and was improved by about 8% to about 10% in comparison to those of Comparative Examples 2 and 3 in which only one of the cathode and the anode included a single-layered active material layer.

Similarly, it may be understood that the charge output value identified by the output/capacity ratio of Example 1 was significantly increased by about 13% or more in comparison to that of Comparative Example 1 in which both the cathode and the anode included a single-layered active material layer, and was improved by about 10% in comparison to those of Comparative Examples 2 and 3 in which only one of the cathode and the anode included a single-layered active material layer.

In Table 1, it may be understood that the degradation rate of Example 1 of the present invention was improved by about 3% to about 6% in comparison to those of Comparative Examples 2 and 3. The degradation rate is a value obtained by dividing the $500^{th}$ discharge capacity by the first discharge capacity, wherein it may denote that the higher the degradation rate is, the less the cell degrades. Thus, as in Comparative Examples 2 and 3, that the degradation rate was decreased may denote that the cell was gradually further degraded while the degradation by side reactions was accumulated due to the difference between the output characteristics of the cathode/anode.

Therefore, according to the result of the degradation rate, since the difference between the output characteristics of the cathode/anode was minimized in the present invention, it may be understood that the degradation of the cell may be reduced.

INDUSTRIAL APPLICABILITY

A lithium secondary battery of the present invention may simultaneously improve high output and high capacity characteristics by including a first active material layer having high output characteristics and a second active material layer having high capacity characteristics respectively on a cathode collector and an anode collector. Therefore, the lithium secondary battery of the present invention may be suitable for secondary batteries.

The invention claimed is:

1. A lithium secondary battery comprising:
   (1) a cathode in which a cathode collector; a first cathode active material layer including a spinel-structured lithium manganese oxide active material on at least one surface of the cathode collector; and a second cathode active material layer including a layer-structured lithium composite oxide active material on the first cathode active material layer are sequentially formed; and
   (2) an anode in which an anode collector; a first anode active material layer including an amorphous carbon-based active material on at least one surface of the anode collector; and a second anode active material layer including at least one selected from the group consisting of a silicon (Si)-based material, and a tin (Sn)-based material on the first anode active material layer are sequentially formed,
   wherein the silicon (Si)-based material comprises any one selected from the group consisting of single Si; a Si—C composite formed by mechanical alloying of Si and a carbonaceous material; a composite formed by mechanical alloying of Si and metal; a carbon-Si nanocomposite; Si coated with Si oxide and carbon, or Si oxide; and a mixture of two or more thereof.

2. The lithium secondary battery of claim 1, wherein the spinel-structured lithium manganese oxide active material comprises $LiMn_2O_4$ or $LiCoMn_2O_4$.

3. The lithium secondary battery of claim 1, wherein the layer-structured lithium composite oxide active material is expressed by Chemical Formula 1 or Chemical Formula 2:

<Chemical Formula 1>

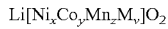
$Li[Ni_xCo_yMn_zM_v]O_2$ (where M is any one selected from the group consisting of aluminum (Al), gallium (Ga), indium (In), and a mixture of two or more elements thereof; and $0.3 \leq x < 1.0$, $0 \leq y$, $z \leq 0.5$, $0 \leq v \leq 0.1$, and $x+y+z+v=1$)

<Chemical Formula 2>

$Li(Li_aM_{b-a-b}M'_{b'})O_{2-c}A_c$ (where 0≤a≤0.2, 0.6≤b≤1, 0≤b'≤0.2, and 0≤c≤0.2; M includes manganese (Mn), and a least one selected from the group consisting of nickel (Ni), cobalt (Co), iron (Fe), chromium (Cr), vanadium (V), copper (Cu), zinc (Zn), and titanium (Ti); M' is at least one selected from the group consisting of Al, magnesium (Mg), and boron (B); and A is at least one selected from the group consisting of phosphorous (P), fluorine (F), sulfur (S), and nitrogen (N)).

4. The lithium secondary battery of claim 1, wherein the amorphous carbon-based active material is obtained from at least one amorphous carbon precursor selected from the group consisting of hard carbon raw materials including sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin, or a vinyl chloride resin; and soft carbon raw materials including a coal-based pitch, a petroleum-based pitch, polyvinyl chloride, a mesophase pitch, tar, or heavy oil.

5. The lithium secondary battery of claim 1, wherein a thickness ratio of the first cathode active material layer:the second cathode active material layer is in a range of 50:50 to 10:90.

6. The lithium secondary battery of claim 5, wherein the thickness ratio of the first cathode active material layer:the second cathode active material layer is in a range of 50:50 to 30:70.

7. The lithium secondary battery of claim 1, wherein a thickness ratio of the first anode active material layer:the second anode active material layer is in a range of 50:50 to 10:90.

8. The lithium secondary battery of claim 7, wherein the thickness ratio of the first anode active material layer:the second anode active material layer is in a range of 50:50 to 30:70.

9. The lithium secondary battery of claim 1, wherein a net density of the first cathode active material layer is in a range of 4.0 g/cc to 4.3 g/cc, and a net density of the second cathode active material layer is in a range of 4.5 g/cc to 4.9 g/cc.

10. The lithium secondary battery of claim 1, wherein a net density of the first anode active material layer is in a range of 1.9 g/cc to 2.15 g/cc, and a net density of the second anode active material layer is in a range of 2.15 g/cc to 2.3 g/cc.

11. The lithium secondary battery of claim 1, wherein a specific surface area of the first cathode active material layer is in a range of 0.4 m²/g to 0.5 m²/g, and a specific surface area of the second cathode active material layer is in a range of 0.5 m²/g to 0.6 m²/g.

12. The lithium secondary battery of claim 1, wherein a specific surface area of the first anode active material layer is in a range of 2 m²/g to 2.7 m²/g, and a specific surface area of the second anode active material layer is in a range of 2.8 m²/g to 3.5 m²/g.

13. The lithium secondary battery of claim 1, wherein a charge and discharge capacity of the first cathode active material layer is in a range of 100 mAh/g to 119 mAh/g, and a charge and discharge capacity of the second cathode active material layer is in a range of 120 mAh/g to 200 mAh/g.

14. The lithium secondary battery of claim 1, wherein a charge and discharge capacity of the first anode active material layer is in a range of 200 mAh/g to 310 mAh/g, and a charge and discharge capacity of the second anode active material layer is in a range of 300 mAh/g to 400 mAh/g.

15. The lithium secondary battery of claim 1, wherein the first cathode active material layer and the first anode active material layer are coated by die coating, and the second cathode active material layer and the second anode active material layer are coated by nozzle coating.

16. A lithium secondary battery comprising:
(1) a cathode in which a cathode collector; a first cathode active material layer including a spinel-structured lithium manganese oxide active material on at least one surface of the cathode collector; and a second cathode active material layer including a layer-structured lithium composite oxide active material on the first cathode active material layer are sequentially formed; and
(2) an anode in which an anode collector; a first anode active material layer including an amorphous carbon-based active material on at least one surface of the anode collector; and a second anode active material layer including transition metal oxide on the first anode active material layer are sequentially formed,
wherein the transition metal oxide comprises any one selected from the group consisting of $SnO_2$, $Fe_2O_3$, $Fe_3O_4$, NiO, CoO, $Co_2O_3$, $CO_3O_4$, $Sn_{1-x}Ti_xO_2$ (x=0.1 to 0.9), $Zn_2SnO_4$, $CoSnO_3$, $CaSnO_3$, $ZnCo_2O_4$, $Co_2SnO_4$, $Mg_2SnO_4$, $Mn_2SnO_4$, and a mixture of two or more thereof.

17. The lithium secondary battery of claim 16, wherein the spinel-structured lithium manganese oxide active material comprises $LiMn_2O_4$ or $LiCoMn_2O_4$.

18. The lithium secondary battery of claim 16, wherein the layer-structured lithium composite oxide active material is expressed by Chemical Formula 1 or Chemical Formula 2:

<Chemical Formula 1>

$Li[Ni_xCo_yMn_zM_v]O_2$

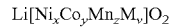

(where M is any one selected from the group consisting of aluminum (Al), gallium (Ga), indium (In), and a mixture of two or more elements thereof; and 0.3≤x<1.0, 0≤y, z≤0.5, 0≤v≤0.1, and x+y+z+v=1)

<Chemical Formula 2>

$Li(Li_aM_{b-a-b}M'_{b'})O_{2-c}A_c$

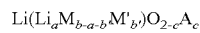

(where 0≤a≤0.2, 0.6≤b≤1, 0≤b'≤0.2, and 0≤c≤0.2; M includes manganese (Mn), and a least one selected from the group consisting of nickel (Ni), cobalt (Co), iron (Fe), chromium (Cr), vanadium (V), copper (Cu), zinc (Zn), and titanium (Ti); M' is at least one selected from the group consisting of Al, magnesium (Mg), and boron (B); and A is at least one selected from the group consisting of phosphorous (P), fluorine (F), sulfur (S), and nitrogen (N)).

19. The lithium secondary battery of claim 16, wherein the amorphous carbon-based active material is obtained from at least one amorphous carbon precursor selected from the group consisting of hard carbon raw materials including sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin, or a vinyl chloride resin; and soft carbon raw materials including a coal-based pitch, a petroleum-based pitch, polyvinyl chloride, a mesophase pitch, tar, or heavy oil.

20. The lithium secondary battery of claim 16, wherein the first cathode active material layer and the first anode active material layer are coated by die coating, and the second cathode active material layer and the second anode active material layer are coated by nozzle coating.

* * * * *